(12) United States Patent
Sulik et al.

(10) Patent No.: US 11,633,066 B2
(45) Date of Patent: Apr. 25, 2023

(54) NON-SLIP TEMPERATURE RESISTANT CUTTING BOARD ASSEMBLY

(71) Applicant: San Jamar, Inc., Elkhorn, WI (US)

(72) Inventors: Jarod Sulik, Elkhorn, WI (US); Michael Young, Mukwonago, WI (US)

(73) Assignee: San Jamar, Inc., Elkhorn, WI (US)

( * ) Notice: Subject to any disclaimer, the term of this patent is extended or adjusted under 35 U.S.C. 154(b) by 0 days.

(21) Appl. No.: 16/903,680

(22) Filed: Jun. 17, 2020

(65) Prior Publication Data

US 2021/0393085 A1 Dec. 23, 2021

(51) Int. Cl.
*A47J 47/00* (2006.01)

(52) U.S. Cl.
CPC .................. *A47J 47/005* (2013.01)

(58) Field of Classification Search
CPC .................................... A47J 47/005
See application file for complete search history.

(56) References Cited

U.S. PATENT DOCUMENTS

| | | | |
|---|---|---|---|
| 648,632 | A | 5/1900 | Parker |
| 693,627 | A | 2/1902 | Sharp |
| 1,233,184 | A | 7/1917 | Chadwick |
| 1,438,157 | A | 12/1922 | Bukachek et al. |
| D159,881 | S | 8/1950 | Zekowski |
| D161,596 | S | 1/1951 | Russ |
| 2,609,024 | A | 9/1952 | Russ |
| 2,796,902 | A | 6/1957 | Mercury |
| 3,089,464 | A | 5/1963 | Mendels |
| D213,093 | S | 1/1969 | Thomas |
| 3,498,470 | A | 3/1970 | Thomas |
| 3,598,164 | A | 8/1971 | August |
| 3,698,594 | A | 10/1972 | Boehlert |

(Continued)

FOREIGN PATENT DOCUMENTS

| | | |
|---|---|---|
| DE | 19635995 | 9/1996 |
| DE | 102006018729 A1 | 10/2007 |

(Continued)

OTHER PUBLICATIONS

Partial European Search Report for EP 21179859, date of completion of the search Nov. 3, 2021, with EP Communication dated Nov. 26, 2021.

(Continued)

*Primary Examiner* — Nirvana Deonauth
(74) *Attorney, Agent, or Firm* — Boyle Fredrickson S.C.

(57) ABSTRACT

A cutting board assembly that includes a plurality of anti-slip support assemblies that maintain usability of at least one of the opposing surfaces of the cutting board assembly for cutting operations and which maintain a sanitary and cleanable construction of the cutting board assembly. Each support assembly includes first and second support bodies that are constructed to engage one another and cooperate with discrete through-holes that are formed in the body of the cutting board. Each support assembly includes an anti-slip layer that protrudes above the discrete cutting surface and sealingly cooperates with the walls of the discrete through-holes to maintain a sanitary and cleanable condition of the cutting board assembly. The body of the cutting board assembly is constructed to withstand exposure to high temperature conditions associated with use thereof.

18 Claims, 4 Drawing Sheets

(56) References Cited

U.S. PATENT DOCUMENTS

| | | |
|---|---|---|
| 3,837,634 A | 9/1974 | Cobb |
| 4,041,964 A | 8/1977 | Shamoon |
| 4,203,231 A | 5/1980 | Van Note |
| D258,036 S | 1/1981 | Sabin |
| D259,166 S | 5/1981 | Krusche |
| D264,531 S | 5/1982 | Trode |
| D281,850 S | 12/1985 | Morin |
| D283,777 S | 5/1986 | Morin |
| 4,653,737 A | 3/1987 | Haskins |
| 4,800,845 A | 1/1989 | Budd |
| D301,820 S | 6/1989 | Wasserman |
| 4,907,789 A | 3/1990 | Tice |
| D308,461 S | 6/1990 | Hosea |
| D335,797 S | 5/1993 | DeGrow |
| D336,407 S | 6/1993 | Harding et al. |
| D339,507 S | 9/1993 | Ancona et al. |
| D348,809 S | 7/1994 | Ladwig |
| 5,363,755 A | 11/1994 | Liang |
| 5,366,208 A | 11/1994 | Benjamin |
| 5,383,503 A | 1/1995 | Johnson |
| 5,386,654 A | 2/1995 | Kroenke |
| D366,780 S | 2/1996 | Brooks |
| 5,527,022 A | 6/1996 | Gibson |
| D372,176 S | 7/1996 | Meisner |
| D374,380 S | 10/1996 | Sawatsky |
| D381,564 S | 7/1997 | Kolada |
| D387,623 S | 12/1997 | Brooks |
| D390,718 S | 2/1998 | Howland et al. |
| 5,865,105 A | 2/1999 | Pepelanov |
| 5,984,294 A | 11/1999 | Bogomolny |
| D442,830 S | 5/2001 | Raucci |
| 6,386,531 B1 | 5/2002 | Prosser |
| 6,422,551 B1 | 7/2002 | Brotz |
| D462,965 S | 9/2002 | Pentz |
| D464,237 S | 10/2002 | Kaposi |
| 6,478,292 B1 | 11/2002 | Sellers |
| D471,025 S | 3/2003 | Chiu |
| D472,776 S | 4/2003 | Porter |
| D473,112 S | 4/2003 | de Groote |
| 6,560,877 B2 | 5/2003 | Sanelli |
| 6,651,970 B2 | 11/2003 | Scott |
| 6,695,299 B1 | 2/2004 | Brotz |
| 6,715,748 B2 | 3/2004 | Thompson |
| D491,412 S | 6/2004 | Devine |
| D492,884 S | 7/2004 | Swope |
| 6,789,792 B1 | 9/2004 | Angland |
| 6,846,449 B2 | 1/2005 | Martin et al. |
| D501,761 S | 2/2005 | Glander |
| D507,463 S | 7/2005 | Brookman et al. |
| 6,913,255 B2 | 7/2005 | Porchia et al. |
| 6,932,336 B1 | 8/2005 | Nudo |
| 6,955,722 B2 | 10/2005 | Ackeerman |
| D512,281 S | 12/2005 | Omdoll |
| 6,986,931 B2 | 1/2006 | Ackerman et al. |
| 6,991,844 B2 | 1/2006 | LeBoeuf et al. |
| 6,994,335 B2 | 2/2006 | Porchia et al. |
| D519,016 S | 4/2006 | Nudo |
| 7,026,034 B2 | 4/2006 | LeBoeuf et al. |
| 7,036,809 B1 | 5/2006 | Mitchell |
| D522,784 S | 6/2006 | Omdoll |
| 7,059,952 B1 | 6/2006 | McRoberts |
| D524,096 S | 7/2006 | Babkes |
| D525,063 S | 7/2006 | Woods et al. |
| 7,125,011 B2 | 10/2006 | McLaughlin |
| 7,134,653 B1 | 11/2006 | Ladenheim |
| 7,178,798 B1 | 2/2007 | Funk et al. |
| D538,096 S | 3/2007 | Bartell |
| D543,423 S | 5/2007 | Benson |
| D549,531 S | 8/2007 | Kishbaugh et al. |
| D551,040 S | 9/2007 | Weeks |
| 7,276,675 B2 | 10/2007 | Faries, Jr. et al. |
| D563,180 S | 3/2008 | Young et al. |
| D573,419 S | 7/2008 | Kaposi |
| D574,200 S | 8/2008 | Pearl |
| D584,117 S | 1/2009 | Curtin |
| D587,031 S | 2/2009 | Pourounidis et al. |
| D587,539 S | 3/2009 | Almeda et al. |
| 7,533,875 B2 | 5/2009 | Willen et al. |
| D605,908 S | 12/2009 | Pearl et al. |
| 7,637,488 B2 | 12/2009 | Zeng |
| 7,647,654 B2 | 1/2010 | Shamroth |
| 7,758,029 B2 | 7/2010 | Lim et al. |
| D620,761 S | 8/2010 | Boudreau |
| D624,921 S | 10/2010 | Hart et al. |
| D631,952 S | 2/2011 | Marcoff |
| D648,632 S | 11/2011 | Ferguson et al. |
| 8,141,860 B2 | 3/2012 | Goldman |
| 8,148,651 B1 | 4/2012 | Coppola |
| D661,354 S | 6/2012 | Kamis |
| D664,405 S | 7/2012 | Chen |
| 8,220,789 B2 | 7/2012 | Pourounidis et al. |
| 8,286,956 B2 | 10/2012 | Pearl et al. |
| 8,360,407 B2 | 1/2013 | Kent |
| D687,268 S | 8/2013 | Difante |
| D728,305 S | 5/2015 | Lou |
| 9,155,427 B1 | 10/2015 | Kumar |
| D793,823 S | 8/2017 | Wu |
| D796,276 S | 9/2017 | King |
| D802,379 S | 11/2017 | Raphael |
| D857,468 S | 8/2019 | Lee |
| 10,617,261 B2 | 4/2020 | Eckholm |
| 10,617,262 B2 | 4/2020 | Eckholm |
| 10,856,699 B2 * | 12/2020 | Collins ................. A47J 47/005 |
| 2003/0218290 A1 | 11/2003 | Goldberg |
| 2004/0119220 A1 | 6/2004 | Davis |
| 2004/0119221 A1 | 6/2004 | Davis |
| 2004/0150151 A1 * | 8/2004 | Diermeier ............. A47J 47/005 |
| | | 269/289 R |
| 2009/0008851 A1 | 1/2009 | Pearl |
| 2018/0110377 A1 | 4/2018 | Assassa |
| 2020/0288916 A1 * | 9/2020 | Berndt .................. A47J 47/005 |

FOREIGN PATENT DOCUMENTS

| | | |
|---|---|---|
| EP | 607015-0001 | 10/2006 |
| EP | 607015-0002 | 10/2006 |
| EP | 607015-0003 | 10/2006 |
| EP | 607015-0004 | 10/2006 |
| EP | 3400857 A1 | 11/2018 |
| GB | 1484460 | 9/1977 |
| GB | 1484460 A * | 9/1977 ............ A47J 47/005 |

OTHER PUBLICATIONS

Extended European Search Report for EP 21179859, date of completion of the search Jan. 13, 2022, with European Communication dated Jan. 27, 2022.

* cited by examiner

NON-SLIP TEMPERATURE RESISTANT CUTTING BOARD ASSEMBLY

BACKGROUND OF THE INVENTION

This invention relates generally to food preparation equipment and, more particularly, to a cutting board assembly that is constructed to resist slippage during use, withstand usage at elevated temperatures customary to cooking operations, and that complies with regulatory sanitation and cleaning requirements associated with use of such devices.

Cutting boards are well known in the art as being useful in food preparation operations. Cutting boards are commonly configured to maintain the integrity of the cutting edge of cutlery while protecting underlying counter surfaces from both the mess associated with the food preparation activities as well as damage by interaction with the cutlery. Cutting boards are provided in a variety of sizes, shapes, and configurations that are commonly configured for suitability with an intended operation or food preparation sequence.

Some cutting board configurations can present significant issues with respect to the development of bacteria upon the cutting surface. That is, during use, cut marks and other abrasions can render the cutting surface susceptible to less than desirable cleaning and/or removal of juices or foodstuff particulates between uses. Discontinuities and/or deviations in the cutting surface of the cutting board from a unitary body increase the potential for the ingress of foodstuffs, the propagation of bacterial growth, and/or tend to detract from or otherwise complicate the cleaning and sanitation operations. As such, many cutting boards are commonly provided as a body having a unitary or homogenous material and a generally planar construction. Unfortunately, such approaches present several additional drawbacks.

In an attempt to mitigate propagation and/or generation of bacteria associated with use of such cutting boards, others provide cutting board systems that are configured for single use or otherwise disposable when the cutting surface is penetrated. Such configurations are less than economical as a majority of the material associated with formation of the cutting board remains unaffected by degradation of the cutting surface. Still further, as alluded to above, current cutting boards, particularly when used in commercial kitchen environments, require frequent replacement when cutting grooves or gouges are deep enough to become difficult to clean or become more susceptible to harboring of bacterial contamination.

Depending on the degree, severity, or number of discontinuities in a cutting surface, continued use of a degraded cutting surface can result in a violation of many applicable health codes and can often result in disciplinary action by health inspectors associated with commercial kitchen operations. Many operators maintain their cutting boards through re-surfacing or planing processes in an effort to extend the usable life of the cutting board in compliance with applicable food health inspector criteria. As disclosed further below, integrally formed or non-serviceable anti-slip features or structures can frustrate the ability to service the underlying cutting board in an economical manner.

When provided in a single body construction wherein an entirety of the cutting board is formed from a cutlery friendly material, such constructions are generally highly susceptible to unexpected or unanticipated translation of the cutting board relative to support surfaces, such as countertops or the like, during usage for food preparation operations. Recognizing such a shortcoming, others provide cutting board assemblies having one or more supports or feet associated with at least one side of the cutting board and which increase the frictional interaction with the support surface. Unfortunately, such approaches present additional concerns that can detract from consumer acceptance of the same. For instance, such supports can be associated with the cutting surface in a manner such that only one planar side of the cutting board is usable for cutting operations and/or serviceable. Use of the surface equipped with the supports as a cutting surface presents additional opportunities to damage the supports and/or exposure of the same to the foodstuffs being processed and can frustrate desires of the user to periodically resurface the cutting board surface to improve the service life associated therewith.

Recognizing such shortcomings, various cutting board assemblies include discrete supports that are integrally formed with one or both sides of the cutting board during manufacture of the cutting board assembly. As disclosed above, such methodologies can detract from the ability to recondition the cutting surfaces after periods of heavy use associated with the same. That is, such approaches further leave the discrete supports exposed to the cutting activities and are generally formed in a non-repairable or serviceable manner should the same be damaged during use of the cutting board for cutting operations. Further, damaged or otherwise degraded support surfaces tend to present interstitial crevices or the like that further complicate cleaning operations and increase the potential for undesired bacterial propagation. Still further, any errors incurred during the manufacturing process can result in waste of not only the time and material associated with formation of the discrete supports but the entirety of the generally higher cost material of the body of the cutting board.

In addition to the concerns above associated with providing a secure non-slip interaction of the cutting board with an underlying support surface and providing a construction that allows the cutting board assembly to retain the desired regulatory cleaning and hygiene compliance, an additional concern of cutting board construction relates to the ability of the cutting board assembly to withstand elevated temperatures customary to cooking operations. Some cutting board assemblies require the cooling of foodstuffs immediately after cooking operations prior to the placement of the foodstuffs relative to the cutting board. Such requirements can detract from efficient kitchen operations and detract from food preparation preferences. Unfortunately, some cutting board systems require such delays to maintain the desired sanitary condition of the cutting board and associated supports due to the nature of the construction of the cutting board assemblies.

Accordingly, there is a need for a cutting board system that is relatively inexpensive to manufacturer or produce, easy to service and/or maintain in a useable condition, provides multiple cutting surfaces, provides slip resistant support of the cutting board regardless of which cutting surface is in use, satisfies regulatory compliance associated with hygiene and sanitation, is constructed to tolerate exposure to higher temperatures without degradation of the cutting surface and/or the operational integrity of the supports associated therewith; can be serviced and/or resurfaced to accommodate continued use of the same in a cost effective manner; and/or solves other problems associated with the manufacture, service, and/or use of the cutting board.

SUMMARY OF THE INVENTION

The present invention discloses a cutting board assembly that resolves one or more of the shortcomings disclosed above. One aspect of the present application discloses a cutting board assembly that includes a plurality of anti-slip support assemblies that maintain usability of the opposing surfaces of the cutting board assembly for cutting operations and which maintain a sanitary and cleanable construction of the cutting board assembly. Each support assembly includes first and second support bodies that are constructed to engage one another and cooperate with discrete through-holes that are formed in the body of the cutting board. Each support assembly includes an anti-slip layer that protrudes above the discrete cutting surface and sealingly cooperates with the walls of the discrete through-holes to maintain a sanitary and cleanable condition of the cutting board assembly. The cutting board assembly is constructed to withstand exposure to high temperature conditions associated with use thereof without degradation of the performance of the anti-slip structures.

Another aspect of the present application that is useable or combinable with one or more of the above aspects, features, and/or objects discloses a cutting board assembly having at least one cutting surface defined by a body constructed of a cutlery friendly material. At least one support assembly cooperates with a through-hole formed through the body between a first cutting surface and a second cutting surface. The support assembly includes a first base and a second base that cooperate with one another when engaged with the through-hole formed in the body from respective opposing directions. An anti-slip layer is formed over at least an exposed portion of each of the first base and the second base when the first base and the second base are engaged with one another.

A further aspect of the present application that is useable or combinable with one or more of the above aspects, features, and/or objects discloses a cutting board assembly having a body formed of a cutlery friendly material and that defines opposing cutting surfaces. A plurality of openings are formed through the body between the opposing cutting surfaces. A support assembly is engaged with each opening and each support assembly includes a first base and a second base that snap-fittingly cooperate with one another. An anti-slip layer is formed about an end of each of the first base and the second base and is constructed to be pressed and/or compressed into a wall of a respective one of the plurality of openings when the first base and the second base are engaged with one another.

Yet another aspect of the present application that is useable or combinable with one or more of the above aspects, features, and/or objects discloses a method of forming a cutting board that includes forming a body of a cutlery friendly material and that defines a first cutting surface and preferably a second cutting surface that is opposite the first cutting surface. A plurality of through-holes are formed through the body between the first cutting surface and the second cutting surface. At least one of the through-holes is stepped so that at least one stepped through-hole has a larger diameter portion nearer each of the first cutting surface and the second cutting surface. A first support body and a second support body are provided that engage one another when introduced to one another from opposing sides of body. At least a portion of the first support body and the second support body is wrapped with an anti-slip material that extends proud of a respective one of the first cutting surface and the second cutting surface and is pressed into engagement with the larger diameter portion of the stepped through-hole when the first support body and the second support body are engaged with one another and secured to the body via the stepped through-hole.

These and other aspects, features, objects, and/or advantages of the present invention will become apparent from the detailed description, claims, and accompanying drawings.

DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 8 is a view similar to FIG. 6 of the second portion of the support assembly shown in

FIG. 7;

DETAILED DESCRIPTION OF THE PREFERRED EMBODIMENTS

Figure 1:
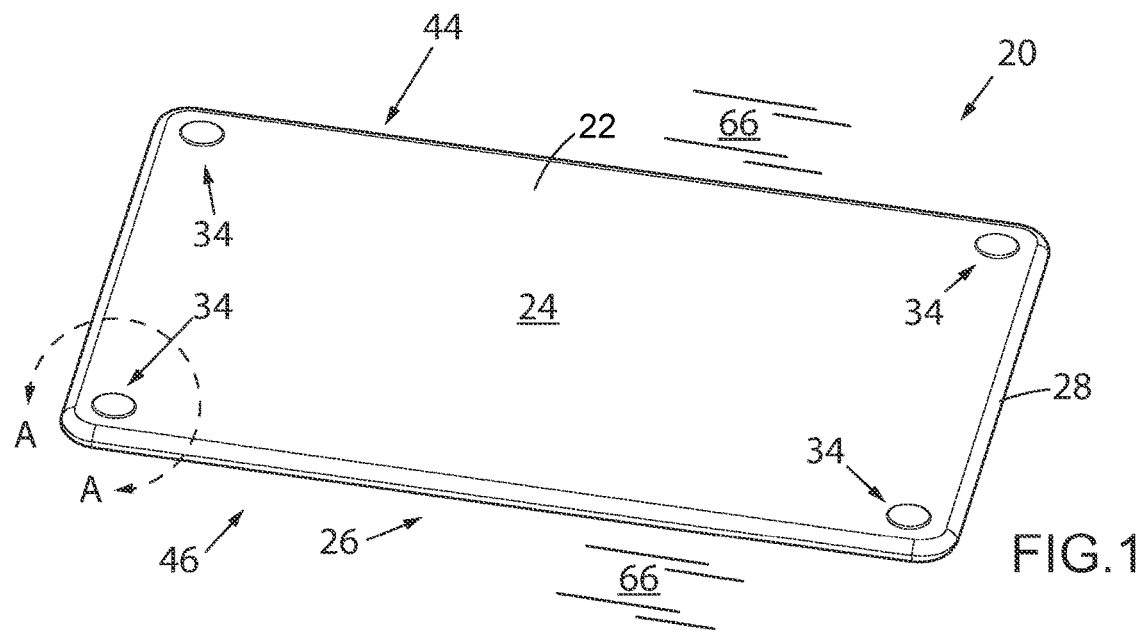
FIG. 1 is a perspective view of a cutting board assembly according to the present invention.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. The various features and advantageous details of the subject matter disclosed herein are explained more fully with reference to the non-limiting embodiments described in detail in the following description.

Figure 2:
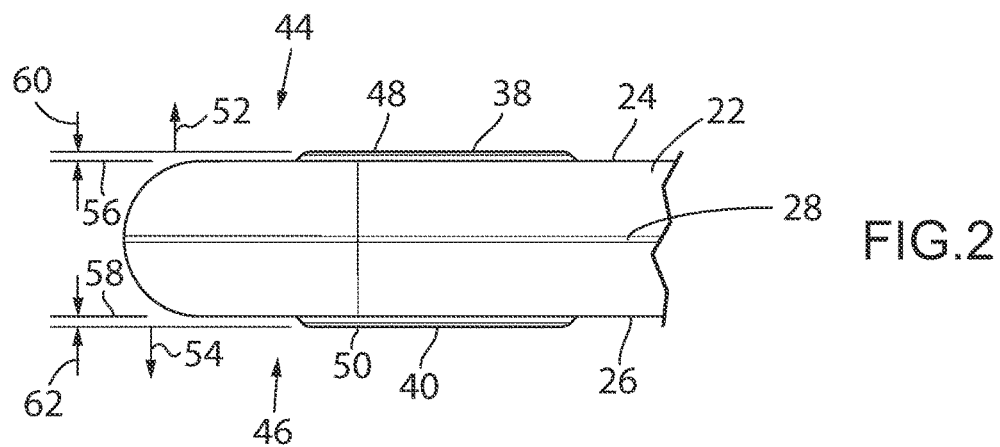
FIG. 2 is a side elevation detail view of a respective corner portion of the cutting board assembly shown in FIG. 1.
Figure 3:
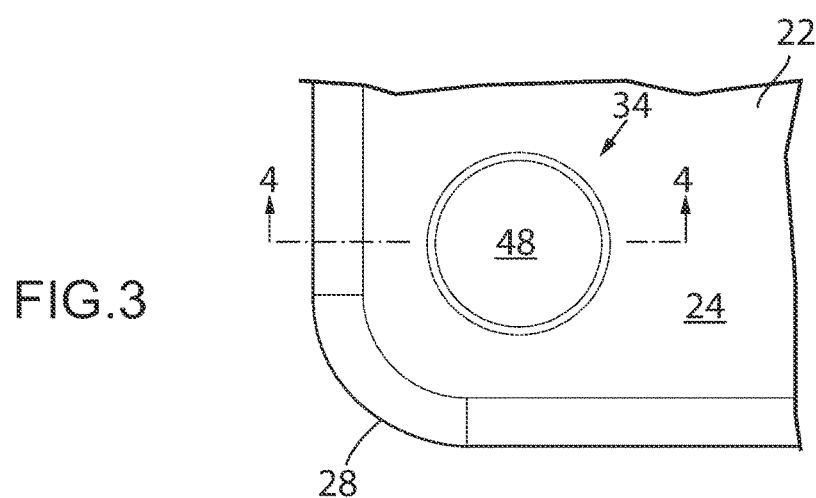
FIG. 3 is a plan view of the detail portion of the cutting board assembly shown in FIG. 2.

Illustrative embodiments of cutting board assembly in accordance with various aspects of the present invention are shown in FIG. 1 through FIG. 10. Initially, FIGS. 1-3 show a cutting board system or assembly 20, and a discrete corner portion thereof, according to the present invention. Cutting board assembly 20 includes a base portion or body 22 that defines at least one cutting surface and preferably a first cutting surface 24 and a second cutting surface 26 that extends across an opposite side of body 22. Preferably, at least one of cutting surfaces 24, 26 of cutting board assembly 20 is formed of a "cutlery friendly" material that resists penetration by the sharpened edge of the cutlery but does not unduly dull the sharpened edge of the cutlery or other kitchen utensils during normal use of a respective one of cutting surfaces 24, 26.

That is to say, cutting surface(s) 24, 26 is preferably conducive to cut resistance and is cutlery "friendly" to mitigate premature degradation of the sharpened edge of the cutlery due to interaction of the blade with a respective one of cutting surface(s) 24, 26. For instance, cutting surfaces 24, 26 of body 22 can be formed of one or more of a polypropylene co-polymer or similar type material, a polypropylene mono-polymer or similar type material, a high-density polyethylene or similar type material, and/or one or more combinations thereof. In a preferred aspect, body 22 of cutting board assembly 20 is constructed in a homogenous manner between cutting surfaces 24, 26. It is further appreciated that although body 22 associated with forming cutting surfaces 24, 26 is preferably formed in a homogenous manner, it is further appreciated that surfaces 24, 26 can be constructed of either the same or dissimilar cutlery friendly materials.

Preferably, body 22 of cutting board assembly 20 is constructed of resin impregnated pulp materials that are subjected to temperature and pressure conditions sufficient to adhere discrete layers of the pulp material into a unitary body. Constructed in such a manner, cutting board body 22 is capable of withstanding exposure to greater temperature conditions, and for greater durations, than cutting board bodies formed of the polypropylene type materials disclosed above. Although cutting board assemblies manufactured of the polypropylene type materials allows for concurrent molding of the anti-slip support structures, the manufacturing processes attenuate to the formation of the body of the cutting board assembly of resin impregnated pulp materials renders injection molding of the anti-slip supports impractical if feasible or possible.

Body 22 of cutting board assembly 20 is defined by a perimeter 28 that bounds a first or top side associated with first cutting surface 24 and second cutting surface 26 that is generally opposite first cutting surface 24. Although shown as having a generally continuous, uninterrupted, or closed cross section shape within the perimeter bounded by perimeter 28, when support assemblies 34 are engaged therewith, it is appreciated that body 22 of cutting board assembly 20 may include other perforations or cutouts associated with defining handles and/or hangers associated with facilitating hanging storage and/or handheld transport of cutting board assembly 20 during use of the same. A plurality of feet, supports, or support assemblies 34 are secured to body 22 within an area bounded by perimeter 28. Preferably, support assemblies 34 are disposed proximate perimeter 28 such that a majority of the area of body 22 bounded by perimeter 28 is available for cutting operations without interference with discrete support assemblies 34 with cutlery being associated therewith.

Still referring to FIGS. 1-3, each support assembly 34 is defined by a first support portion 38 and a second support portion 40 that cooperate with one another from opposing lateral sides 44, 46 of body 22 such that respective terminal or exposed end portion 48, 50 of each of supports portions 38, 40 extend in a respective outward lateral directions, indicated by arrows 52, 54 beyond respective planes, indicated by lines 56, 58, associated with discrete cutting surfaces 24, 26. As disclosed further below, exposed end portions 48, 50 are formed of an anti-slip or high friction material and are constructed to support cutting board assembly 20 relative to an underlying support surface. Referring to FIG. 2, each of supports portions 38, 40 preferably extend an operable distance, indicated by dimensions 60, 62 in the respective outward lateral directions 52, 54 beyond planes 56, 58 associated with cutting surfaces 24, 26 defined by body 22. The operable distance is defined as a distance sufficient to allow the respective outward facing end portions 48, 50 associated with support portions 38, 40 to engage an underlying support surface, such as a countertop 66 (FIG. 1) or the like during cutting operations such that body 22 of cutting board assembly 20 is supported by the respective outward facing end portions 48, 50 associate with the downward facing surface of cutting board assembly 20.

As disclosed further below, an exterior exposed surface of each support assembly 34 is preferably constructed of a material, such as silicone, rubber, or thermoplastic type materials, that is selected to mitigate slippage between cutting board assembly 20 and an underlying support surface, such as countertop 66 or the like, during use of cutting board assembly 20. Preferably, at least an outward facing surface or end portions 48, 50 are constructed of a slip resistant resilient thermoplastic material such as a styrenic block copolymer (TPS, SBS, TPE's, or SBC) material, a thermoplastic polyolefin elastomer (TPO, TPOE, TPE-o) material, a thermoplastic polyurethane (TPU, TPUE) material, a thermoplastic copolyester (TPC, TPE-E, Co-PE) material, and/or preferably of a thermoplastic vulcanizates (TPV) material. Although cutting board assembly 20 is shown having a construction wherein the cutting board assembly is flippable or reversible so as to provide multiple cutting surfaces, it is appreciated the cutting board assembly 20 can be constructed with a series of anti-slip resilient end portions associated with only one of the generally planar opposing sides of body 22.

Figure 4:
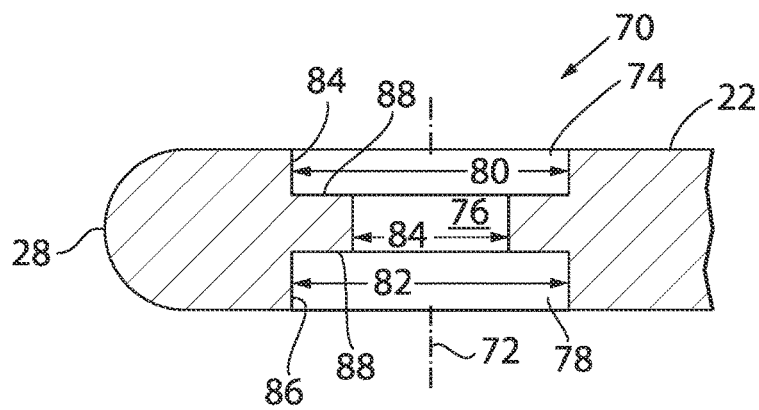
FIG. 4 is a cross section elevation view of the detail view shown in FIG. 2 taken along line 4-4 shown in FIG. 3 with a support assembly removed therefrom.

Turning now to FIG. 4, body 22 of cutting board assembly 20 includes a through-hole 70 that is constructed to cooperate with a discrete support assembly 34 and secure the respective support assembly 34 relative to body 22 in a secure and sealed manner and a manner which maintains the operable association of each support assembly 34 relative to the underlying body 22. Each through-hole 70 extends along an axis 72 that is generally aligned with the lateral outward directions 52, 54 (FIG. 2) and defined by a first portion 74, a second portion 76, and a third portion 78. First and third portions 74, 78 of through-hole 70 are each defined by a diameter 80, 82 that is preferably larger than a diameter 84 associated with second portion 76 of through-hole 70.

Preferably, diameters 80, 82 are similar to one another within customary manufacturing tolerances although it is appreciated that they need not be. It should be appreciated that the similar shapes associated with portions 74, 78 facilitates reversible cooperation of support assemblies 34 therewith as disclosed further below. A shoulder 86 and a land or seat 88 is defined by each of first portion 74 and third portion 78 of through-hole 70. Whereas shoulder(s) 86 extend in a direction generally aligned with axis 72, respective seats 88 extend in a crossing direction relative thereto. As disclosed further below, the various contours associated with each through-hole 70 cooperate with respective support assemblies 34 so as to provide a sealed interaction therewith. Although through-holes 70, and the discrete portions 74, 76, 78 associated therewith, are disclosed as having generally circular cross sectional shapes, it is appreciated that other through-holes shapes, and correspondingly shaped support assemblies, could be employed in a manner consistent with the present application.

Figure 5:
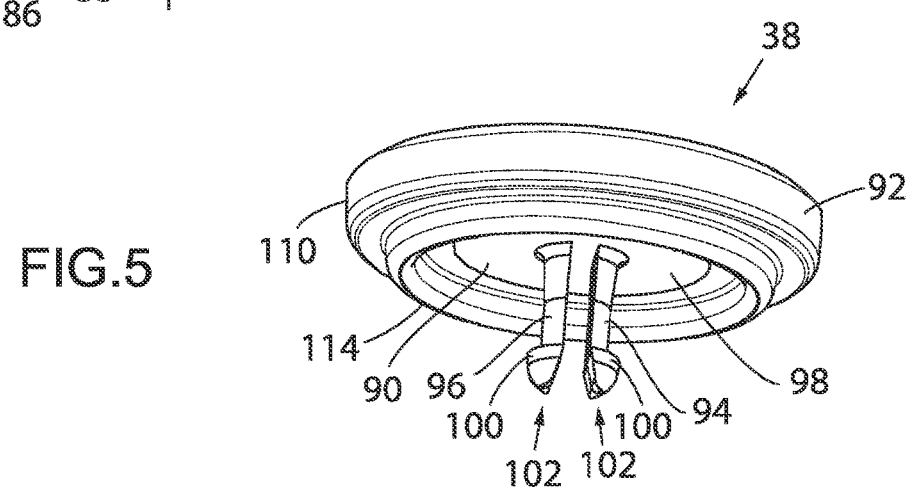
FIG. 5 is a perspective view of a first portion of a support assembly of the cutting board assembly shown in FIG. 1.
Figure 6:
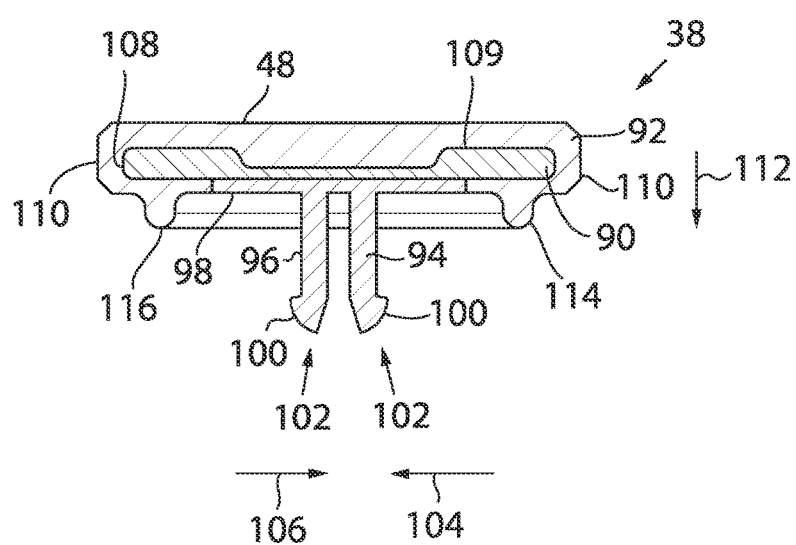
FIG. 6 is a radial cross section elevation view of the first portion of the support assembly shown in FIG. 5 taken along line 4-4 shown in FIG. 3.
Figure 7:
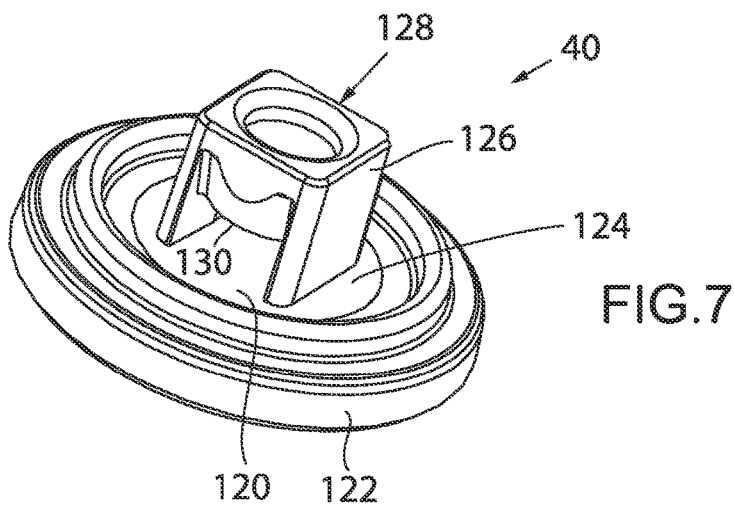
FIG. 7 is a perspective view of a second portion of the support assembly of the cutting board assembly shown in FIG. 1.
Figure 8:
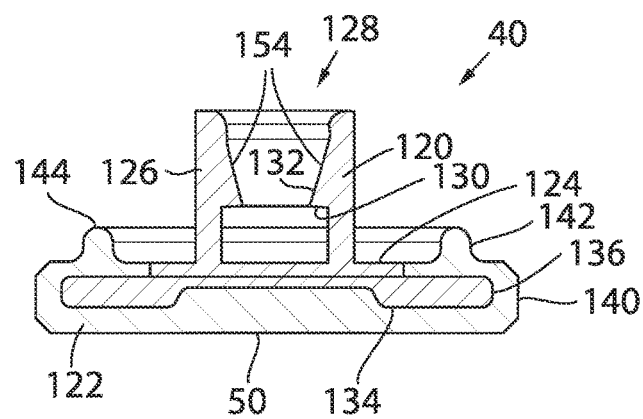

FIGS. 5-6 show various views of first support portion 38 whereas FIGS. 7-8 show various views of second support portion 40 wherein the first support portion 38 and the second support portion 40 are disengaged from one another and yet to be associated with a respective through-hole 70 defined by the body 22 of an underlying cutting board assembly 20. Referring to FIGS. 5 and 6, first support portion 38 is defined by a base 90 and an anti-slip material layer 92 that is formed over at least a portion thereof. Base 90 is preferably constructed of a food grade safe material and/or of a material that is more rigid than the material associated with anti-slip material layer 92. Although preferably constructed of a food grade safe material, it should be appreciated that base 90 is not exposed or otherwise accessible during use of cutting board assembly 20. As disclosed further below, anti-slip material layer 92 is secured or otherwise bonded or co-molded with base 90 so as to be inseparable therefrom. Base 90 is preferably formed of a nylon material whereas layer 92 is preferably formed of a slip-resistant resilient material such as TPV as disclosed above.

A pair of posts or projections 94, 96 extend from an inward facing surface 98 of base 90. A barb or hook 100 is formed proximate a distal end 102 of one or more of projections 94, 96. Although shown as extending in opposing outward radial directions, it is appreciated that hooks 100 may be provided in other constructions and/or configurations such as an orientation wherein the hooks extend in a more generally inward oriented radial direction relative to the longitudinal axis of projections 94, 96. Projections 94, 96 are deflectable in generally inward respective radial directions, indicated by arrows 104, 106, relative to base 90. Base 90 is further defined by an outward radial edge 108 that extends between an upward facing surface 109 and the respective distal ends 102 associated with projections 94, 96. As disclosed further below, those portions of base 90 that are not overlapped with anti-slip layer 92 are preferably oriented in inward facing directions relative to an assembled support assembly 34.

Anti-slip layer 92 is defined by an outward radial edge 110 that extends in a generally downward axial direction, indicated by arrow 112, relative to upper facing end portion 48 thereof. In a preferred embodiment, radial edge 110 is oriented in a canted or slightly angled orientation relative to the axial direction of portion 38 such that an upward directed portion of the radial edge of layer 92 is slightly larger than an inward directed portion of the radial edge 110 of layer 92. Such a construction facilitates more convenient indexing of the respective support portions 38, 40 relative to an underlying through-hole 70 and pressing and/or compression of the radial edge 110 of layer 92 into sealing engagement with the upstanding portion of the wall of an associated through-hole 70 as disclosed further below.

Layer 92 further preferably defines an optional annular ridge 114 that extends in direction 112 relative to surface 98 of base 90. As shown in FIG. 6, layer 92 extends in a generally continuous manner across an upward or outward facing surface 109 of base 90 and a portion of the downward or inward facing surface 98 thereof. Said another way, anti-slip layer 92 wraps about the top, a portion of bottom, and an outward radial edge 108 of base 90 in a generally continuous or uninterrupted manner. As alluded to above and as disclosed further below, the distal end 116 of ridge 114 and the radial edge 110 of anti-slip layer 92 are constructed to cooperate with a respective portion, 74, 78 of a respective through-hole 70 in a sealed manner when a respective first support portion 38 and corresponding second support portion 40 are engaged with one another and associated with the respective through-hole 70 defined by body 22 of cutting board assembly 20.

Referring to FIGS. 7 and 8, second support portion 40 is defined by a base 120 and an anti-slip layer 122 that is formed about a portion thereof. Base 120 includes an inwardly directed surface 124 and a projection or a post 126 that extends therefrom. Post 126 includes an opening 128 formed in a portion thereof. Opening 128 includes a stop or a catch 130 that is defined by at least a portion of a radially inward facing surface 132 of post 126. Base 120 includes a laterally outward facing surface 134 that is overlapped by the radially outward facing surface 50 of anti-slip layer 122. Base 120 is further defined by an outward radial edge 136 that is also overlapped by layer 122 in a manner similar to the construction of base 90 and layer 92. Like base 90, base 120 is also preferably formed of a more rigid material than layer 122 such as nylon or the like.

Layer 122 is defined by an outward radial edge 140 that extends between surface 50 and an annular ridge 142 defined thereby and which extends in a direction similar to post 126 of body 120. Ridge 142 extends to a terminal end 144 that is oriented radially inboard relative to edge 140 of layer 122. Like layer 92 of first support portion 38, layer 122 of second support portion 40 wraps around at least a portion of base 120. In a similar manner, outward radial edge 140 of layer 122 is also canted or oriented at an angle relative to axis 72 such that the outward facing surface of edge 140 has a slightly larger diameter than an inboard oriented portion of edge 140. Like edge 110, such a construction facilitates indexing of portion 40 relative to a through-hole and sealed interaction therewith at a location proximate the outward most interface between edge 140 and a respective through-hole 70.

Figure 9:
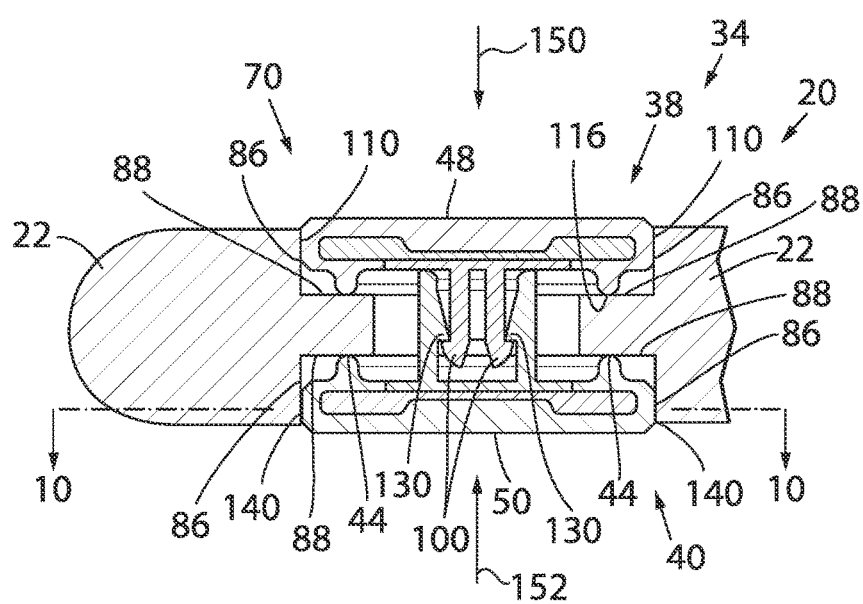
FIG. 9 is a cross section elevation view of the support assembly engaged with a body of the cutting board assembly along line 4-4 shown in FIG. 3.

Referring to FIG. 9, during assembly of cutting board assembly 20, respective first support portion(s) 38 and second support portion(s) 40 are axially associated with one another from opposing sides of respective through-holes 70 defined by body 22 so as to be generally aligned with axis 72 thereof. Inboard directed lateral displacement of respective support portions 38, 40 in a direction toward one another, as indicated by arrows 150, 152 allows radially inward lateral deflection 104, 106 of projections 94, 96 along respective ramp sections defined by post 126 of base 120 until respective hooks 100 associated with respective projections 94, 96 are oriented to engage the respective catch 130 defined by post 126 associated with the base of the respective second support portion 40. The hysteresis of projections 94, 96 facilitates the relative outward radial translation of the discrete hooks 100 when the same traverse the edges defined by catch 130 defined by post 126 of base 120 of second support portion 40. It should be appreciated that such a construction allows respective first support portions 38 and respective second support portions 40 to snap-fittingly cooperate with one another when respective first support portions 38 and second support portions 40 engage one another as the respective support portions are engaged with a respective through-hole 70 defined by body 22 of cutting board assembly 20.

It should be further appreciated that, once engaged with one another, destruction of discrete support assemblies 34 is the only methodology available to effectuate separation of the respective support portions 38, 40 and/or dissociation of the discrete support assemblies 34 from a body 22 of an underlying cutting board assembly 20. When engaged with one another, distal ends 116 of ridges 114 and outward radial edge 110 of layer 92 engage a respective seat 88 and shoulder 86 of the respective portion 74, 78 of through-hole 70 and distal ends 144 of ridge 142 and outward radial edge 140 of layer 122 of second support portion 40 are pressed to engagement with the respective seat 88 and shoulder 86 of the opposing portion 74, 78 of the corresponding through-hole 70.

Forming anti-slip layers 92, 122 of a more pliable material than the respective bases 90, 120 of respective support portions 38, 40 allows pressing and/or preferably compression of the radial edges 110, 140 and the terminal ends 116, 144 of ridges 114, 142 of the respective first and second support portions 38, 40 with the respective seat 88 and shoulder 86 associated with a respective portion 74, 78 associated with a respective through-hole 70. Such a construction provides redundant or duplicative sealed interaction between respective anti-slip layers 92, 122 relative to the adjoining surfaces of body 22 and in a methodology that provides a sealed interaction proximate the laterally outward oriented interface of each support assembly 34 with the underlying body 22 of cutting board assembly 20. Such a construction mitigates the ingress of fluids and particulates at the radial interface of each support assembly 34 and body 22 of cutting board assembly 20. Such consideration further improves the ability to maintain a sanitary condition of cutting board assembly 20 during use as well as cleaning operations.

The snap-fittable cooperation between each first support portion 38 and second support portion 40 further reduces the potential for undesirable and/or unexpected separation therebetween. It should be further appreciated that the destroyable methodology associated with the removal or disengagement of the discrete support assemblies 34 from cutting board assembly 20 further accommodates reconditioning and/or repurposing cutting board assembly 20 in an economical manner. That is, rather than discarding a cutting board assembly due to degradation of either of the cutting surfaces 24, 26 or one or more of the discrete anti-slip support structures, cutting board assembly 20 can be expeditiously serviced and/or reconditioned via removal of the more economically producible support assembly, reconditioning of the cutting surfaces 24, 26 in a desired manner, and subsequent association and engagement of replacement support assemblies 34 with the reconditioned body 22 of the cutting board assembly. Such considerations tend to encourage users to recondition cutting board assembly 20 in a timelier manner rather than incur the undesired expense associated with replacement of the same.

Figure 10:
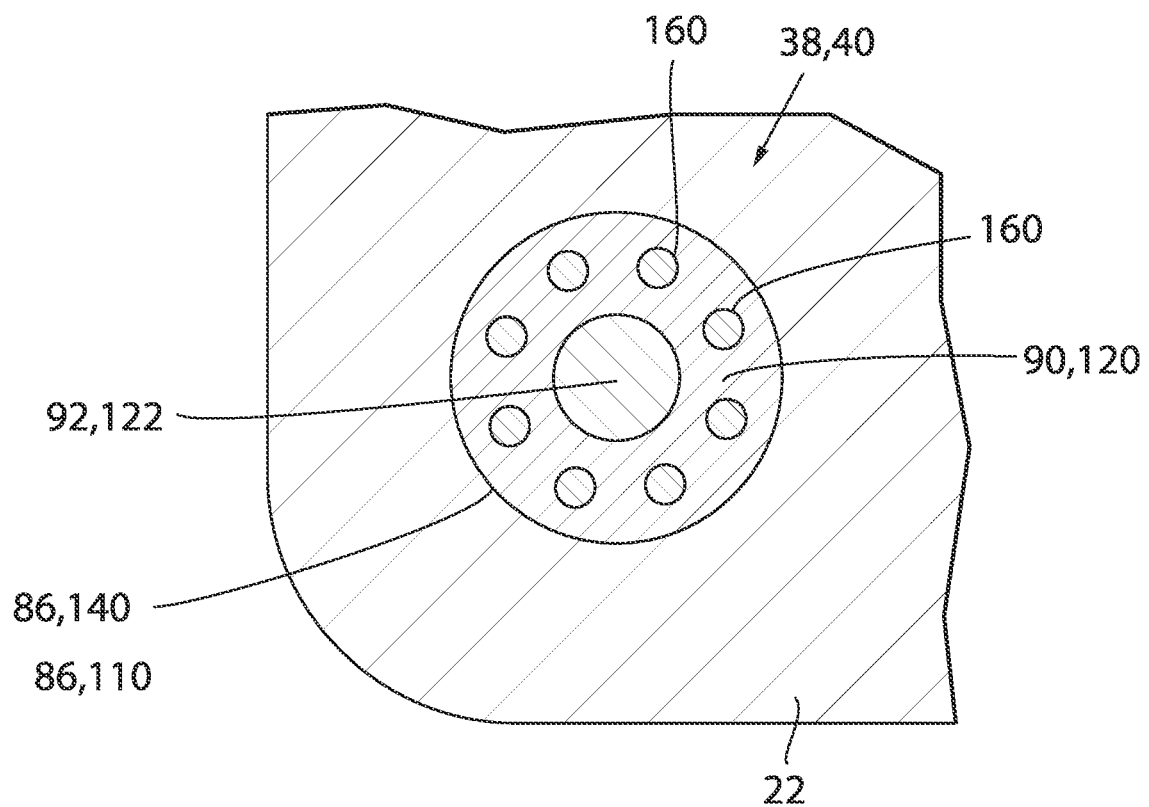
FIG. 10 is a cross section plan view of the second portion of the support assembly shown in FIG. 7 taken along line 10-10 shown in FIG. 9.

Referring to FIG. 10, and being further directed to the robust nature associated with the construction and utilization of support assemblies 34, each of bases 90, 120 is preferably constructed to include one or more passages or openings 160 that extend through the respective base in a direction that is generally aligned with axis 72 (FIG. 4) and/or a direction aligned with directions 150, 152 (FIG. 9). Openings 160 are constructed to accommodate the passage of a portion of the respective anti-slip layer 92, 122 therethrough and in a generally continuous manner between opposing sides of the respective base 90, 120. Preferably, openings 160 are oriented to be generally aligned with the laterally overlapping area of each respective anti-slip layer 92, 122 relative to the underlying base 90, 120. Such a consideration mitigates undesired failure and/or separation between the respective laterally inward or inboard and laterally outward or outboard facing surfaces of anti-slip layers 92, 122 relative to the underlying respective base 90, 120 and provides a secure tactile feel of support portions 38, 40 during association thereof with body 22 and during use of cutting board assembly 20.

Although each of through-hole 70 and respective support assemblies 34 are shown as having generally circular cross-sectional shapes, is appreciated that through-hole 70 and support assemblies 34 may be provided in other cross-sectional shapes. It is further appreciated that end portions 48, 50 associated with the exposed portions of respective support assemblies 34 may be provided with an indication and/or designation, such as alternate shapes, colors, or indicia associated with providing an indication to the user as to the relative intended use or the particular foodstuffs intended to associated therewith, such as red meats, chicken, fish, vegetables and/or greens associated with use of the respective opposing cutting surfaces 24, 26 associated with the opposing sides of body 22 of cutting board assembly 20. Such a consideration mitigates the potential of cross contamination between foodstuffs prepared with cutting board assembly 20.

As disclosed above, it should be appreciated that the similar cross-sectional shapes associated with the discrete portions 38, 40 of each of support assemblies 34 and the corresponding respective portions 74, 78 of the respective through-holes 70 allows bidirectional cooperation of respective support assemblies 34 during engagement of respective support portions 38, 40 with one another and when engaged with body 22 of cutting board assembly 20. Such a consideration improves the expediency associated with assembly and/or servicing of cutting board assembly 20.

Preferably, each of body 22 and layers 92, 122 which collectively define the exposed surfaces of cutting board assembly 20 are constructed of materials able to withstand exposure to chemicals attenuate to customary cleaning processes and suitable for exposure and/or use in the preparation of food stuffs. Body 22 of cutting board assembly 20 is preferably constructed of a resin impregnated pulp material and is better suited to withstand exposure and/or use of the cutting board assembly 20 at elevated temperatures or high heat conditions, such as hot cookware, foodstuffs, or the like without appreciable thermal degradation or expansion thereof. Body 22 and support assemblies 34 are constructed to maintain the sealed interaction between each support assembly 34 and the underlying body 22 of cutting board assembly 20 and maintain the cleanable and sanitary nature thereof for repeated food preparation and cleaning sequences and to tolerate exposure or use of the cutting board assembly with high temperature foodstuffs and cooking devices.

Therefore, one embodiment of the present invention includes a cutting board assembly having a plurality of anti-slip support assemblies that maintain usability of the opposing surfaces of the cutting board assembly for cutting operations and which maintain a sanitary and cleanable construction of the cutting board assembly. Each support assembly includes first and second support bodies that are constructed to engage one another and cooperate with discrete through-holes that are formed in the body of the cutting board. Each support assembly includes an anti-slip layer that protrudes above the discrete cutting surface and sealingly cooperates with the walls of the discrete through-holes to maintain a sanitary and cleanable condition of the cutting board assembly. The cutting board assembly, including any anti-slip support assemblies associated therewith, is constructed to withstand exposure to high temperatures conditions associated with use thereof.

Another embodiment of the invention that includes or is useable or combinable with one or more of the above aspects, features, and/or objects of the above embodiments includes a cutting board assembly having at least one cutting surface defined by a body constructed of a cutlery friendly material. At least one support assembly cooperates with a through-hole formed through the body between a first cutting surface and a second cutting surface. The support assembly includes a first base and a second base that cooperate with one another when engaged with the through-hole formed in the body from respective opposing directions. An anti-slip layer is formed over at least an exposed portion of each of the first base and the second base when the first base and the second base are engaged with one another.

A further embodiment of the present invention that is useable or combinable with one or more of the above aspects, features, and/or objects of the above embodiments includes a cutting board assembly having a body formed of a cutlery friendly material and that defines opposing cutting surfaces. A plurality of openings are formed through the body between the opposing cutting surfaces. A support assembly is engaged with each opening and each support assembly includes a first base and a second base that snap-fittingly cooperate with one another. An anti-slip layer is formed about an end of each of the first base and the second base and is constructed to be pressed and/or compressed into a wall of a respective one of the plurality of openings when the first base and the second base are engaged with one another.

Yet another embodiment of the invention that is useable or combinable with one or more of the aspects, features, and/or objects of the above embodiments includes a method of forming a cutting board. The method includes forming a body of a cutlery friendly material and that defines a first cutting surface and preferably a second cutting surface that is opposite the first cutting surface. A plurality of through-holes are formed through the body between the first cutting surface and the second cutting surface. At least one of the through-holes is stepped so that the at least one stepped through-hole has a larger diameter portion nearer each of the first cutting surface and the second cutting surface. A first support body and a second support body are provided that engage one another when introduced to one another from opposing sides of body. At least a portion of the first support body and the second support body is wrapped with an anti-slip material that extends proud of a respective one of the first cutting surface and the second cutting surface and is pressed into engagement with the larger diameter portion of the stepped through-hole when the first support body and the second support body are engaged with one another and secured to the body via the stepped through-hole.

Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents, alternatives, and modifications, aside from those expressly stated, are possible and within the scope of the appended claims.

What is claimed is:

1. A cutting board assembly comprising:
  a cutting surface defined by a body; and at least one support assembly that cooperates with a through-hole formed through the body, the at least one support assembly comprising:
    a first base and a second base that are constructed to cooperate with one another when engaged with the through-hole formed in the body from respective opposing directions, at least one of the first base and the second base having a radially extending barb and the other of the first base and the second base having a catch that is constructed to engage the barb during axial translation of the first base relative to the second base to prevent axial translation of the first base relative to the second base in an opposing axial direction when the barb is engaged with the catch; and
    an anti-slip layer formed over at least an exposed portion of at least one of the first base and the second base and compressed into engagement with a first surface and a second surface of the body defined by the through-hole to provide a first sealed interaction and a second sealed interaction that are spaced from one another and both located inward relative to the cutting surface of the body when the first base and the second base are engaged with one another.

2. The cutting board assembly of claim 1 wherein the at least one support assembly further comprises a plurality of support assemblies.

3. The cutting board assembly of claim 1 wherein the first base and the second base snap-fittingly cooperate with one another.

4. The cutting board assembly of claim 1 wherein the first surface and the second surface of the body defined by the through-hole define at least one shoulder proximate a respective one of a first side of the body and a second side of the body.

5. The cutting board assembly of claim 4 wherein the anti-slip layer wraps about a portion of a respective the at least one of the first base and the second base to engage the first surface and the second surface of the at least one shoulder.

6. The cutting board assembly of claim 5 wherein the at least one shoulder is further defined as a first shoulder proximate the first side of the body and a second shoulder proximate the second side of the body.

7. The cutting board assembly of claim 6 wherein the anti-slip layer associated with each of the first base and the second base wraps around a respective end of the first base and the second base and engages at least two surfaces of a respective one of the first shoulder and the second shoulder when the first base and the second base are engaged with one another.

8. A cutting board assembly comprising: a body formed of a cutlery friendly material and that defines opposing cutting surfaces; a plurality of openings formed through the body between the opposing cutting surfaces; and a support assembly engaged with at least one of the plurality of openings, each support assembly comprising: a first base and a second base that snap-fittingly cooperate with one another; an anti-slip layer formed about an end of at least one of the first base and the second base and constructed to be compressed into a wall of a respective one of the plurality of openings when the first base and the second base are engaged with one another; and wherein each of the plurality of openings that receives a support assembly are further defined as stepped openings and each stepped opening has a larger cross-sectional area adjacent a respective one of the opposing cutting surfaces and a smaller cross-sectional area between the larger cross-sectional areas and a shoulder formed therebetween.

9. The cutting board assembly of claim 8 wherein the plurality of openings includes a discrete opening disposed proximate a respective one of a plurality of corners of the body.

10. The cutting board assembly of claim 8 wherein the anti-slip layer associated with the at least one of the first base and the second base is constructed to be compressed into engagement with an axially extending surface of the larger cross-sectional area of each respective opening and the shoulder formed therebetween when the first base and the second base are engaged with one another.

11. The cutting board assembly of claim 8 wherein each anti-slip layer is formed of one of a silicone material and a thermoplastic material.

12. The cutting board assembly of claim 8 wherein at least one of the first base and the second base includes a radially extending barb and the other of the first base and the second base includes a catch that is deflectable in a radial direction during axial translation in a first axial direction of the barb relative to the catch and is biased in an opposing radial direction into interfering engagement with the barb when the first base is engaged with the second base and prevents axial translation in an opposing axial direction therebetween.

13. The cutting board assembly of claim 8 wherein each of the first base and the second base are formed of a material that is more rigid than a material of the anti-slip layer.

14. A cutting board assembly comprising:
a body that defines opposing cutting surfaces;
a plurality of openings formed through the body between the opposing cutting surfaces; and
a support assembly engaged with at least one of the plurality of openings such that opposing ends of the support assembly extend outward beyond a respective one of the opposing cutting surfaces of the body when the support assembly is engaged with the at least one of the plurality of openings, each support assembly comprising:
a first base and a second base that snap-fittingly cooperate with one another;
an anti-slip layer formed about an end of at least one of the first base and the second base and constructed to be compressed into a wall of a respective one of the plurality of openings when the first base and the second base are engaged with one another to provide a first sealed interaction and a second sealed interaction that are spaced from one another; and
wherein at least one of the first base and the second base includes a radially extending barb and the other of the first base and the second base includes a catch that is deflectable in a radial direction during axial translation in a first axial direction of the barb relative to the catch and is biased in an opposing radial direction into interfering engagement with the barb when the first base is engaged with the second base and prevents axial translation in an opposing axial direction therebetween.

15. The cutting board assembly of claim 14 wherein the plurality of openings includes a discrete opening disposed proximate each a respective one of a plurality of corners of the body.

16. The cutting board assembly of claim 14 wherein the anti-slip layer associated with the at least one of the first base and the second base is constructed to be compressed into engagement with an axially extending surface of a larger cross-sectional area adjacent a respective one of the opposing cutting surfaces and a smaller cross-sectional area between the larger cross-sectional areas and of the respective opening and a shoulder formed therebetween when the first base and the second base are engaged with one another.

17. The cutting board assembly of claim 14 wherein each anti-slip layer is formed of one of a silicone material and a thermoplastic material.

18. The cutting board assembly of claim 14 wherein each of the first base and the second base are formed of a material that is more rigid than a material of the anti-slip layer.

\* \* \* \* \*